Oct. 26, 1937.    J. W. DYER ET AL    2,097,118
AIRCRAFT
Filed July 26, 1935    2 Sheets-Sheet 1

Oct. 26, 1937.   J. W. DYER ET AL   2,097,118
AIRCRAFT
Filed July 26, 1935   2 Sheets-Sheet 2

INVENTORS
J. W. Dyer
D. Kay
BY Chas. J. Williamson
ATTORNEY

Patented Oct. 26, 1937

2,097,118

UNITED STATES PATENT OFFICE 2,097,118

AIRCRAFT

John William Dyer and David Kay, Edinburgh, Scotland, assignors to Kay Gyroplanes Limited, Edinburgh, Scotland Application July 26, 1935, Serial No. 33,399
In Great Britain July 27, 1934

11 Claims. (Cl. 244—18)

This invention relates to aircraft of the kind in which the lift is derived wholly or partly from an overhead rotative wing system, commonly referred to as a "rotor", which turns about a more or less vertical axis, and particularly to such aircraft in which the rotor is auto-rotative, i. e., rotated in flight under the action of the flight wind, although it is applicable to rotors which can be driven in flight.

In aircraft of this character, it is already known to effect or assist the banking of the aircraft for a turn by mounting the rotor in such a manner as to be capable of being inclined laterally in either direction, and it is also known to provide for a fore and aft inclination of the rotor to enable the direction of flight to be changed from the horizontal.

For this purpose, the rotor has usually been mounted on a form of mast capable of being swung in either a lateral or in a fore-and-aft direction about its lower end.

For example, the mast has been mounted upon a form of universal joint, in which the lateral tilting takes place independently of the fore- and-aft tilting.

The object of the present invention, therefore, is to provide an improved form of support for the rotor which shall be particularly simple in construction and operation and adjustable to the smallest degree desired.

According to the present invention, an aircraft of the kind referred to has the characteristic feature that the rotor-supporting member is capable of tilting laterally and in a fore-and-aft direction by being mounted for such movements upon a single turnable member integral with or mounted upon an axle or equivalent, the arrangement being such that the axis about which lateral tilting takes place and the axis about which tilting in the fore-and-aft direction takes place both intersect the axis of rotation of the axle or equivalent. The rotor-supporting member may be mounted for tilting laterally of the aircraft and also in a fore-and-aft direction on a member which is fixed upon an axle or equivalent and has its axis inclined to the axis of the axle or equivalent, the arrangement being such that when the axle or equivalent is turned, the rotor supporting member is caused to tilt laterally of the aircraft, the direction of tilt being dependent upon the direction in which the axle or equivalent is turned.

In one construction, the rotor is turnably carried by a mast or the like supported by a hinge-pin or zed-crank member, comprising coaxial bearing parts and a crank pin member inclined thereto upon which the lower end of the mast or the like is pivotally mounted, means being provided for restraining or controlling the fore- and-aft movement of the mast or the like which can take place about said crank-pin member.

In such a construction, an axle may be arranged at right angles or substantially at right angles to the fore-and-aft plane of symmetry of the aircraft, a barrel being fixed on the axle with its axis inclined to the axis thereof, and a rotor-supporting mast or the like being pivotally arranged at its lower end on the barrel with its axis substantially vertical and arranged to the rear of the axis of the axle.

For a fuller description of the type of hinge-pin member or zed-crank member preferred for supporting the rotor, reference may be made usefully to the specification of Patent No. 1,750,778, granted to one of the present applicants, in which various constructions of such members are described, as being used for varying the angles of incidence of airscrews, revolving blades or wings, and propellers. According to the invention described and claimed in said specification, the means for varying the angles of incidence of revolving blades and the like comprised two coaxial parts turnably arranged in hinge-pin supporting means and a crank pin member on which each blade was turnably mounted, the axis of the crank pin member being inclined to the common axis of the coaxial parts.

With this arrangement (which we wish to be understood as including its various modifications) by virtue of its mounting, the blade is rotated substantially about its general longitudinal axis so as to vary its angle of incidence, and the plane in which the crank pin axis is inclined when in its mid-position is the general plane of rotation. In contra-distinction to this arrangement, in adapting a crank pin member or zed-crank member for tilting the rotor in accordance with the present invention, the plane in which the axis of the crank-pin member is inclined when the rotor is in the normal or mid position the axis of the mast, for instance, is at right angles thereto.

It will be readily appreciated that by the use of an arrangement of this sort the mast can be tilted laterally at will by rotating the coaxial parts of the crank-pin member, whilst at the same time it is free to tilt about the axis of said crank-pin member (i. e., in a substantially fore- and-aft direction).

In assembling the parts in an aircraft, it will be obvious that as the crank-pin member or its equivalent is inclined to the axis of its supporting parts, either the axis of the crank-pin member or that of said supporting parts can be arranged at right angles to the longitudinal axis of the machine but, in practice, it is preferred, according to the present invention, to adopt the second of these courses, since the longitudinal tilting of the mast can then take place along a line inclined to the longitudinal axis of the machine and, consequently, the unbalancing of the lift due to the variation in the angles of incidence of any laterally extending blades will be compensated, at least to some extent, by the shifting of the rotor centre with respect to the centre of gravity of the aircraft.

In a constructional embodiment of the invention, the mast on which the rotor turns is provided at its lower end with a pair of parallel bracket members extending vertically downwards. Said bracket members are pivotally carried at one end by the crank pin member of the device for effecting lateral tilting, and are interconnected at their other ends by a cross-member to which an anchoring link is universally connected. The coaxial parts of the hinge-pin member are arranged at right angles to the longitudinal axis of the aircraft, and, consequently, the crank-pin member itself lies at an angle thereto and the parallel bracket members, being at right angles to the axis of the crank-pin member, are in turn inclined to the longitudinal axis of the machine. The position of the mast may be either vertically above or slightly behind the crank-pin member, whilst the bracket members extend for a relatively substantial distance rearwardly up to the position in which the anchoring link is attached. It is preferred to mount the mast so that its vertical axis lies between the crank-pin member and the anchoring link, since in this way the load is divided more equally between these two parts. This feature is also of importance in facilitating the carrying out of the invention described in our co-pending application of even date relating to the adjustment of the angles of incidence of the rotor blades. In the said co-pending application, the operating means of the incidence-control is described as being disposed in the axis of rotation of the rotor and comprising, in one embodiment, a shaft threaded, or otherwise adapted, for reciprocation in the rotor-mast. Clearly, it is desirable to leave a clear space for the passage of said shaft through the rotor support and, for this reason, the two inventions are preferably used in conjunction with each other.

An arrangement constructed in accordance with the present invention, with or without the arrangement of the incidence-control operating means just described, can also be usefully combined with the features of the invention forming the subject of another of our co-pending applications of even date relating to the mounting of the pinion transmitting the initial drive to the rotor hub. According to that invention, the pinion is so mounted, as to be capable of being swung into or out of mesh with gearing associated with the hub and, in one form, is described as being eccentrically mounted in a rotatable support. In combining that invention with the present one, the pinion support is carried by the lower end of the rotor mast or the brackets associated therewith.

The rotation of the crank-pin member for effecting lateral tilting of the mast obviously can be carried out in any convenient manner, e. g., by means of a rotatable shaft operated manually in any suitable way or it may be power operated. Conveniently, however, the shaft is coupled to a turnable control arranged in the cockpit of the aircraft.

One constructional form of the invention is described, by way of example, on the accompanying sheets of drawings, whereon:

Figure 1:
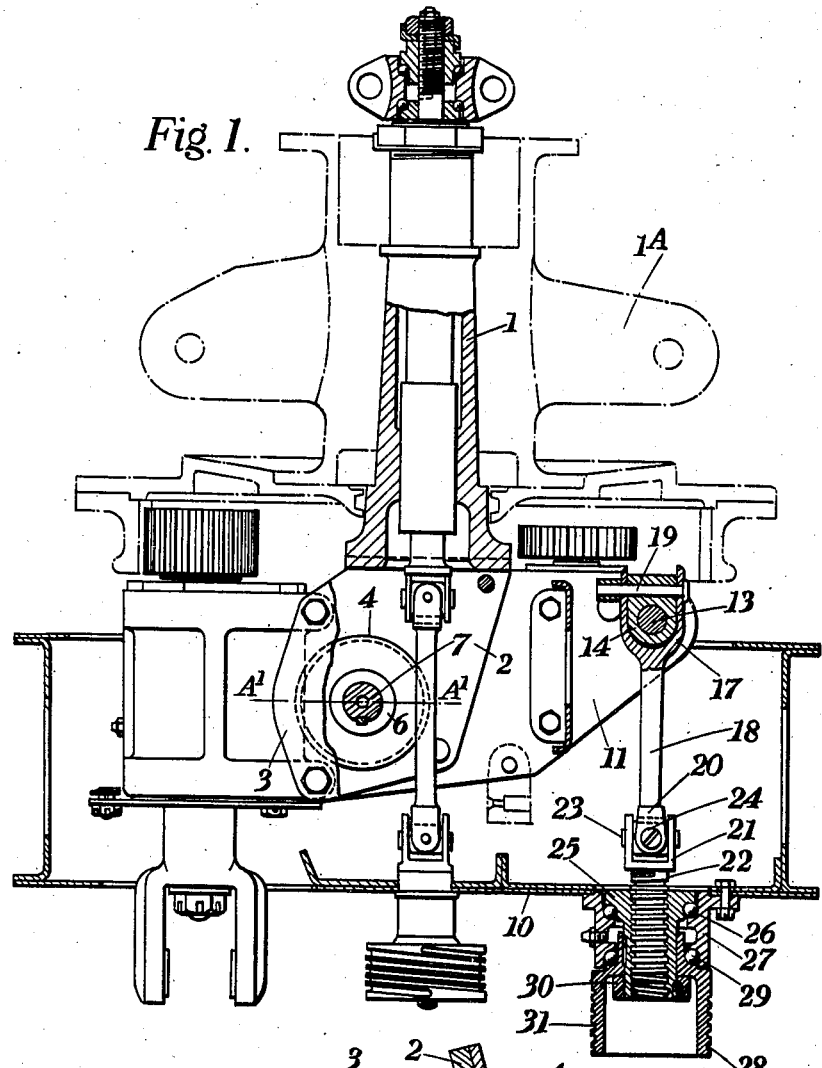
Fig. 1 is an elevation, partly in section, of the rotor-supporting mast and its associated mechanism.
Figure 4:
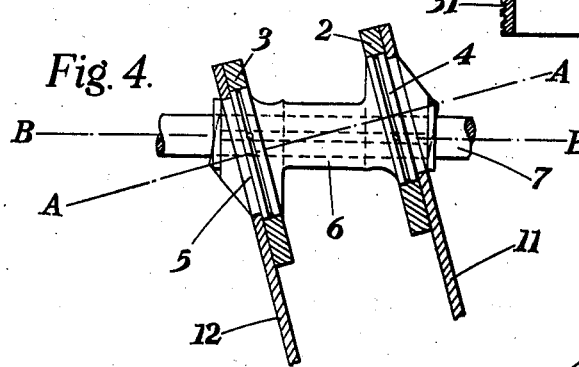
Fig. 4 is a fragmentary view, partly in section, illustrating the mounting of the mast upon the zed-crank member.
Figure 2:
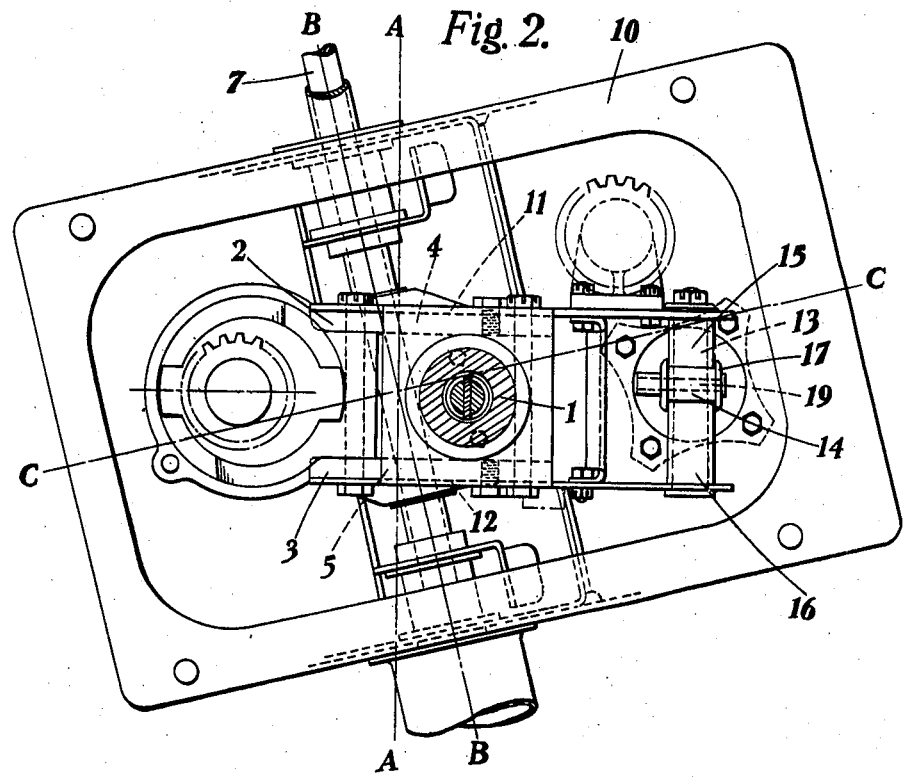
Fig. 2 is a top plan view corresponding to Fig. 1 and partly in section.
Figure 3:
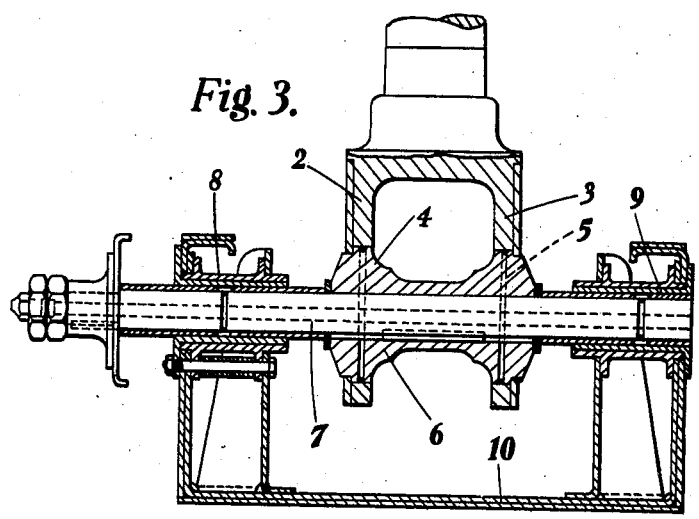
Fig. 3 is a transverse section on the line B—B in Fig. 2.

Referring to the drawings:

The hollow mast 1 is forked at its lower end and provided with two downwardly depending lateral cheeks 2 and 3 which are journalled, respectively, upon the bearing parts 4 and 5 of a hinge-pin or zed-crank barrel 6 keyed upon the zed-crank axle 7. The latter is journalled in bearings 8 and 9 supported in the side cheeks of the rotor-supporting bracket 10 which is mounted upon a pylon structure extending upwards from the fuselage. As will be seen from Fig. 2, the axis A—A of the coaxial parallel bearing parts 4 and 5 of the zed crank barrel is inclined to the axis B—B of the zed crank axle 7 and, this being the case, either the axis of the barrel 6 or the axis of the axle 7 can be arranged at right angles to the centre line C—C of the aircraft but it is preferred to arrange the axis of the axle at right angles to the centre line C—C, since the longitudinal tilting of the mast 1 will then take place along a line inclined to the centre line of the machine and, consequently, any balancing of the lift due to the variation in the angles of incidence of any laterally extending blades will be compensated, at least to some extent, by the shifting of the rotor centre with respect to the centre of gravity of the aircraft. Side plates 11 and 12 are secured, respectively, to the side cheeks 2 and 3 and extend rearwardly of the mast 1 as shown in Figs. 1, 2 and 4, and at their rear ends are interconnected by a pin 13 upon which a pivot block 14 is pivotally mounted, said block being flanked on opposite sides by distance tubes 15 and 16. The forked end 17 of a link 18 embraces the block 14 and is secured thereto by a pin 19 passing through the arms of the fork and through the said block. The lower end of the link 18 is also forked at 20 and is connected for universal movement to the forked upper end 21 of a spindle 22 by means of the cross pins 23 and 24, the shank of the spindle being screwed, as shown in Fig. 1, into a correspondingly screw-threaded drum 25. The upper end of the latter is rotatably mounted by ball bearings 26 in a bearing housing 27 which is secured to the exterior of the base of the rotor-supporting bracket 10, the upper end of a cable drum 28 being keyed to the lower end of the drum 25 and rotatably arranged in the interior of the bearing housing by means of the lower ball-bearings 29. Thus, the drum 25 and drum 28 can turn as a unit within the bearing housing 27 but they are fixed against axial movement relative to the housing by means of a nut 30 which is screwed upon the bottom end of the drum 25. The drum 28 is provided with grooves 31 for the reception of an operating cable.

As previously mentioned, the side cheeks 2 and 3 of the mast 1 are pivotally mounted upon the bearing parts 4 and 5 of the barrel 6 of the zed crank. Consequently, the link 18, through the mechanism described above, forms means for anchoring the mast to the rotor-supporting bracket 10 and it also forms a link in the chain of mechanism for adjusting the fore-and-aft inclination of the mast.

The zed crank, constituted by the axle 7 and the barrel 6 having its axis A—A inclined to that B—B of the axle, is of course one constructional form of zed crank or hinge-pin member such as described and claimed in Patent No. 1,750,778 granted to one of the present applicants as being used for varying the angles of incidence of airscrews, revolving blades or wings and propellers. In its present application to the lateral tilting of the rotor hub 1A, however, the horizontal or substantially horizontal plane in which the axis A'—A' of the zed crank barrel 6 is disposed when in the mid position is at right angles to the axis of the mast 1, see Fig. 1. Thus, to obtain the lateral tilting of the mast 1 it is only necessary to turn the zed crank axle 7, the mast at the same time being free (unless restrained) to tilt in a fore-and-aft direction about the common axis of the bearings 4 and 5 of the zed crank barrel 6.

Suitable means are provided for restraining or controlling the fore-and-aft movement of the mast 1 about the bearing parts 4 and 5, such means in this construction consisting of the mechanism comprising the pin 13, the link 18, the screwed spindle 22 and its housing 25. The fore-and-aft inclination of the mast 1 can obviously be varied by turning the pulley 28 and thereby raising or lowering the rear ends of the plates 11 and 12 and turning the mast about the common axis of the zed crank barrel 6.

We claim:

1. An aircraft of the kind referred to, comprising an axle arranged at right angles, or substantially at right angles, to the fore-and-aft plane of symmetry of the aircraft, a barrel fixed on the said axle with its axis inclined to the axis of the axle, a rotor-supporting mast or the like pivotally arranged at its lower end on the said barrel with its axis substantially vertical and arranged to the rear of the axis of the said axle and means for controlling the pivotal movement of the mast or the like in a fore-and-aft direction about the said barrel.

2. An aircraft as claimed in claim 1, wherein the lower end of the mast or the like is forked and comprises arms pivotally mounted on bearing parts of the said barrel, the axle on which the barrel is fixed being turnably arranged in bearings formed in a fixed part mounted upon the fuselage and the forked end of the mast or the like being operatively connected to a link which acts to anchor the mast or the like to the said fixed part.

3. In an aircraft of the type in which the lift is derived wholly or partly from an overhead rotative wing system the combination comprising a rotatable member supported in the aircraft, and a rotor-supporting member carried by said rotatable member, said rotor-supporting member being tiltable in a fore-and-aft direction about said rotatable member and means connecting said rotatable member with said rotor-supporting member for translating rotary movement of said rotatable member into a tilting movement of said rotor-supporting member in a direction substantially parallel to the axis of said rotatable member.

4. A combination according to claim 1 in which the axle is turnable to vary the inclination of the rotor-supporting mast or the like under the control of the pilot.

5. An aircraft of the kind referred to, comprising an axle supported in the structure of the aircraft, a barrel fixed on said axle with its axis inclined to the axis of the axle, a rotor supporting mast or the like pivotally arranged at its lower end on said barrel with its axis substantially vertical and arranged to the rear of the axis of the axle and means for controlling the pivotal movement of the mast or the like in a fore-and-aft direction about said barrel.

6. A combination according to claim 5 in which the means for controlling the pivotal movement of the mast or the like in a fore-and-aft direction, is under the control of the pilot.

7. A combination according to claim 5, in which the axis of the barrel is inclined to the longitudinal axis of the aircraft, whereby the longitudinal tilting of the rotor-supporting mast takes place along a line inclined to the longitudinal axis of the aircraft.

8. In an aircraft of the type referred to, the combination comprising a rotatable member mounted to rotate about an axis fixed in relation to the frame of the aircraft and extending in a direction generally transverse to the fore-and-aft axis of the aircraft, a rotor-supporting member rotatably mounted upon said rotary member, motion translating means between said members arranged to translate rotation of the rotatable member into an axial tilting movement of the rotor-supporting member in a direction substantially parallel to the axis of said rotatable member, and means for tilting the rotor-supporting member fore-and-aft of the aircraft about said rotary member.

9. In an aircraft of the type referred to, the combination of a single rotatable member mounted to rotate about an axis fixed in relation to the structure of the aircraft, a rotor-supporting member supported by said rotatable member for lateral and fore-and-aft tilting movement relative to said rotatable member, means for rotating the rotatable member about its axis, means for tilting said rotor-supporting member fore-and-aft about said rotatable member independently of said turning means, and motion translating means connecting said rotatable member and said rotor-supporting member for translating a rotating movement of said rotary means into a lateral tilting movement of said rotor-supporting member.

10. In an aircraft of the type referred to, the combination of a rotatable member mounted to rotate about an axis fixed in relation to the structure of the aircraft, a rotor-supporting member mounted on said rotatable member, and motion translating means connecting said members arranged to translate rotary movement of said rotatable member about its fixed axis into a tilting movement of said rotor-supporting member in a plane substantially parallel to said fixed axis.

11. In an aircraft of the type referred to, the combination comprising a rotatable member mounted to rotate about an axis fixed in relation to the frame of the aircraft and extending in a direction generally transverse to the fore-and-aft direction of the aircraft, a rotor-supporting member rotatably mounted upon said rotary member, motion translating means between said members arranged to translate rotation of the rotatable member into tilting movement of the rotor-supporting member in a direction substantially parallel to the axis of said rotatable member, and means for tilting the rotor-supporting member in a plane extending in a general vertical and longitudinal direction but oblique to the longitudinal axis of the aircraft.

JOHN WILLIAM DYER.
DAVID KAY.